(12) United States Patent
Mola

(10) Patent No.: US 10,282,274 B2
(45) Date of Patent: May 7, 2019

(54) PRESENTING DIFFERENCES BETWEEN CODE ENTITY INVOCATIONS

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/622,841

(22) Filed: Jun. 14, 2017

(65) Prior Publication Data

US 2018/0365125 A1    Dec. 20, 2018

(51) Int. Cl.
*G06F 11/32* (2006.01)
*G06F 11/36* (2006.01)

(52) U.S. Cl.
CPC .......... *G06F 11/362* (2013.01); *G06F 11/323* (2013.01); *G06F 11/3664* (2013.01)

(58) Field of Classification Search
CPC ...... G06F 11/32–11/321; G06F 11/323; G06F 11/36–11/3624; G06F 11/3636; G06F 11/366–11/368; G06F 11/3692
See application file for complete search history.

(56) References Cited

U.S. PATENT DOCUMENTS

| | | | | |
|---|---|---|---|---|
| 5,615,331 A * | 3/1997 | Toorians | ............. | G06F 11/3664 714/5.11 |
| 6,003,143 A * | 12/1999 | Kim | ...................... | G06F 11/323 706/46 |
| 6,016,474 A * | 1/2000 | Kim | ..................... | G06F 11/3664 709/224 |
| 6,018,786 A | 1/2000 | Krick et al. | | |
| 6,026,362 A * | 2/2000 | Kim | ..................... | G06F 11/3664 705/317 |
| 6,029,002 A * | 2/2000 | Afifi | ........................ | G06F 8/433 714/E11.209 |

(Continued)

FOREIGN PATENT DOCUMENTS

JP    2005222422 A    8/2005

OTHER PUBLICATIONS

Jones et al., Visualization of Test Information to Assist Fault Localization, published by ICSE'02, May 19025, 2002, ACM, pp. 467-477 (Year: 2002).*

(Continued)

*Primary Examiner* — Thuy Dao
*Assistant Examiner* — Zheng Wei
(74) *Attorney, Agent, or Firm* — Workman Nydegger

(57) ABSTRACT

Presenting differences between code entity invocations includes identifying a plurality of families of invocations of a code entity. Each family is defined based upon a plurality of attributes that identify a class of runtime behavior of the code entity. First attribute(s) of a first family are identified. These first attribute(s) substantially contributed to classifying a first class of invocations of the code entity within the first family. Similarly, second attribute(s) of a second family are identified. These second attribute(s) substantially contributed to classifying a second class of invocations of the code entity within the second family. Differences between at least two invocations of the code entity are presented, based on differences between the one or more first attributes and the one or more second attributes.

18 Claims, 6 Drawing Sheets

(56) References Cited

U.S. PATENT DOCUMENTS

| | | | |
|---|---|---|---|
| 6,145,121 A | 11/2000 | Levy et al. | |
| 6,230,313 B1* | 5/2001 | Callahan, II | G06F 11/3404 714/35 |
| 6,795,836 B2 | 9/2004 | Arnold et al. | |
| 6,854,108 B1* | 2/2005 | Choi | G06F 11/3664 714/38.1 |
| 6,892,325 B2 | 5/2005 | Bates et al. | |
| 6,895,577 B1* | 5/2005 | Noble | G06F 11/3676 714/38.12 |
| 6,901,581 B1 | 5/2005 | Schneider | |
| 6,959,431 B1* | 10/2005 | Shiels | G06F 11/3676 714/38.12 |
| 7,209,058 B2 | 4/2007 | Swoboda | |
| 7,284,052 B1 | 10/2007 | Anderson | |
| 7,392,514 B2 | 6/2008 | Edwards | |
| 7,530,056 B1* | 5/2009 | Yaari | G06F 11/3604 717/128 |
| 7,620,938 B2 | 11/2009 | Edwards et al. | |
| 7,681,182 B1 | 3/2010 | Nistry et al. | |
| 7,730,460 B1* | 6/2010 | Warren | G06F 11/323 717/130 |
| 7,739,664 B2 | 6/2010 | Bates et al. | |
| 7,757,065 B1 | 7/2010 | Jourdan et al. | |
| 7,810,079 B2* | 10/2010 | Cates | G06F 11/3612 714/100 |
| 7,814,486 B2 | 10/2010 | Papakipos et al. | |
| 7,861,226 B1* | 12/2010 | Episkopos | G06F 11/3696 717/124 |
| 8,015,552 B1 | 9/2011 | Lindahl et al. | |
| 8,032,866 B1 | 10/2011 | Golender et al. | |
| 8,037,285 B1 | 10/2011 | Thalk et al. | |
| 8,108,844 B2 | 1/2012 | Crutchfield et al. | |
| 8,132,159 B1 | 3/2012 | Lindahl et al. | |
| 8,161,460 B2* | 4/2012 | Drumm | G06Q 10/10 717/124 |
| 8,166,348 B1 | 4/2012 | Kulkami et al. | |
| 8,276,127 B2 | 9/2012 | Rydh et al. | |
| 8,364,691 B2 | 1/2013 | Kennedy et al. | |
| 8,375,368 B2 | 2/2013 | Tuck et al. | |
| 8,423,965 B2 | 4/2013 | Goel et al. | |
| 8,438,427 B2* | 5/2013 | Beck | G06F 11/323 714/46 |
| 8,443,349 B2 | 5/2013 | Papakipos et al. | |
| 8,448,156 B2 | 5/2013 | Demetriou et al. | |
| 8,516,301 B2* | 8/2013 | Beck | G06F 11/323 714/15 |
| 8,521,765 B2 | 8/2013 | George et al. | |
| 8,522,047 B2 | 8/2013 | Eker et al. | |
| 8,612,939 B2 | 12/2013 | Marenco | |
| 8,612,944 B2* | 12/2013 | Sundaram | G06F 11/3604 717/136 |
| 8,719,800 B2 | 5/2014 | Chow et al. | |
| 8,745,591 B2 | 6/2014 | De Smet et al. | |
| 8,751,466 B1 | 6/2014 | Tsay | |
| 8,863,089 B2* | 10/2014 | Rabin | G06F 11/30 717/125 |
| 8,910,120 B2 | 12/2014 | Srinivasa et al. | |
| 8,924,912 B2 | 12/2014 | Ho et al. | |
| 8,935,673 B1 | 1/2015 | Ashkenazi et al. | |
| 8,997,057 B1 | 3/2015 | Diwan et al. | |
| 9,020,939 B2 | 4/2015 | Brodsky et al. | |
| 9,122,795 B1 | 9/2015 | Daudel et al. | |
| 9,129,058 B2 | 9/2015 | Cui et al. | |
| 9,189,254 B2* | 11/2015 | Kushman | G06F 9/4446 |
| 9,195,562 B2 | 11/2015 | Luo et al. | |
| 9,251,364 B2 | 2/2016 | Ture et al. | |
| 9,262,538 B2 | 2/2016 | Melman | |
| 9,292,419 B1* | 3/2016 | Kintali | G06F 11/3676 |
| 9,467,437 B2 | 10/2016 | Krishnaprasad et al. | |
| 9,477,576 B2 | 10/2016 | Granshaw et al. | |
| 9,483,387 B1* | 11/2016 | Allocca | G06F 11/3688 |
| 9,501,383 B2 | 11/2016 | Bolignano | |
| 9,552,195 B2* | 1/2017 | Adl-Tabatabai | G06F 8/443 |
| 9,632,914 B2 | 4/2017 | Cheng et al. | |
| 9,652,101 B2 | 5/2017 | McMillen et al. | |
| 9,940,369 B1 | 4/2018 | Mola | |
| 9,983,978 B1 | 5/2018 | Mola et al. | |
| 2002/0100025 A1* | 7/2002 | Buechner | G06F 11/3447 717/131 |
| 2002/0129343 A1 | 9/2002 | Pinter et al. | |
| 2003/0121027 A1* | 6/2003 | Hines | G06F 11/362 717/135 |
| 2003/0191783 A1 | 10/2003 | Wolczko et al. | |
| 2004/0133881 A1* | 7/2004 | Chamberlain | G06F 11/3684 717/125 |
| 2004/0243894 A1 | 12/2004 | Smith et al. | |
| 2005/0097100 A1 | 5/2005 | Galindo-Legaria et al. | |
| 2005/0223361 A1* | 10/2005 | Belbute | G06F 11/3688 717/124 |
| 2005/0235264 A1* | 10/2005 | Hines | G06F 11/362 717/124 |
| 2005/0246682 A1* | 11/2005 | Hines | G06F 11/362 717/109 |
| 2006/0074622 A1 | 4/2006 | Scott et al. | |
| 2006/0129871 A1 | 6/2006 | Smith | |
| 2006/0212688 A1 | 9/2006 | Chaudhry et al. | |
| 2007/0168989 A1 | 7/2007 | Edwards et al. | |
| 2007/0294671 A1* | 12/2007 | Demetriou | G06F 11/3664 717/124 |
| 2008/0098207 A1* | 4/2008 | Reid | G06F 11/362 712/227 |
| 2008/0155342 A1 | 6/2008 | O'Callahan | |
| 2008/0168427 A1* | 7/2008 | Bestgen | G06F 11/3636 717/128 |
| 2008/0168428 A1* | 7/2008 | Bates | G06F 11/3612 717/129 |
| 2008/0178161 A1* | 7/2008 | Cates | G06F 11/3612 717/133 |
| 2008/0270482 A1 | 10/2008 | Hillberg et al. | |
| 2008/0270995 A1* | 10/2008 | Dimpsey | G06F 11/36 717/128 |
| 2008/0288741 A1 | 11/2008 | Lee et al. | |
| 2009/0199163 A1 | 8/2009 | Soroker et al. | |
| 2009/0265402 A1 | 10/2009 | Dussud et al. | |
| 2010/0049938 A1 | 2/2010 | Izumi et al. | |
| 2010/0180245 A1* | 7/2010 | Rutten | G06F 11/323 716/113 |
| 2010/0180263 A1 | 7/2010 | Lee et al. | |
| 2010/0299654 A1 | 11/2010 | Vaswani et al. | |
| 2010/0306588 A1 | 12/2010 | Hamilton et al. | |
| 2011/0055818 A1* | 3/2011 | Ishikawa | G06F 8/51 717/128 |
| 2011/0087926 A1 | 4/2011 | Arnold et al. | |
| 2011/0167412 A1 | 7/2011 | Kahlon et al. | |
| 2011/0283247 A1* | 11/2011 | Ho | G06F 11/362 716/107 |
| 2011/0314264 A1 | 12/2011 | Horley et al. | |
| 2012/0110589 A1 | 5/2012 | Ghosh et al. | |
| 2012/0185675 A1 | 7/2012 | Kim et al. | |
| 2012/0260133 A1* | 10/2012 | Beck | G06F 11/323 714/38.1 |
| 2012/0260135 A1* | 10/2012 | Beck | G06F 11/323 714/45 |
| 2012/0324236 A1 | 12/2012 | Srivastava et al. | |
| 2013/0036403 A1 | 2/2013 | Geist | |
| 2013/0066927 A1 | 3/2013 | Hillberg et al. | |
| 2013/0104107 A1 | 4/2013 | DeSmet et al. | |
| 2013/0179867 A1* | 7/2013 | Fitterer | G06F 8/71 717/130 |
| 2013/0218315 A1 | 8/2013 | Jaeger | |
| 2013/0339931 A1* | 12/2013 | Rode | G06F 11/3664 717/128 |
| 2014/0068564 A1* | 3/2014 | Jain | G06F 11/1471 717/124 |
| 2014/0108463 A1 | 4/2014 | Gagliardi et al. | |
| 2014/0282418 A1 | 9/2014 | Wood et al. | |
| 2015/0026666 A1 | 1/2015 | Tojo et al. | |
| 2015/0066881 A1 | 3/2015 | Sundaram et al. | |
| 2015/0143344 A1 | 5/2015 | Davis | |
| 2015/0186251 A1* | 7/2015 | Friedler | G06F 11/3672 717/124 |

(56) References Cited

U.S. PATENT DOCUMENTS

| | | | | |
|---|---|---|---|---|
| 2015/0234730 | A1* | 8/2015 | Puthuff | G06F 11/3636 717/128 |
| 2015/0347278 | A1* | 12/2015 | Sinha | G06F 11/3664 714/38.1 |
| 2015/0378870 | A1 | 12/2015 | Marron et al. | |
| 2016/0019133 | A1* | 1/2016 | Forg cs | G06F 11/3612 717/128 |
| 2016/0041894 | A1 | 2/2016 | Reid et al. | |
| 2016/0292061 | A1 | 10/2016 | Marron et al. | |
| 2016/0364325 | A1 | 12/2016 | Ouzzani et al. | |
| 2017/0103010 | A1* | 4/2017 | Chang | G06F 11/362 |
| 2017/0277616 | A1* | 9/2017 | Topiwala | G06F 11/364 |
| 2018/0089064 | A1* | 3/2018 | Duer | G06F 11/3664 |

OTHER PUBLICATIONS

Wang et al., Automated Oath Generation for Software Fault Localization, published by ASE'05, Nov. 7-11, 2005, LongBeach, CA, ACM, pp. 347-351 (Year: 2005).*

Miranskyy, et al., "An Iterative, Multi-Level, and Scalable Approach to Comparing Execution Traces", In Proceedings of the the 6th joint meeting of the European software engineering conference and the ACM SIGSOFT symposium on The foundations of software engineering, Sep. 3, 2007, pp. 537-540.

Guo, et al., "Accurately Choosing Execution Runs for Software Fault Localization", In Journal of International Conference on Compiler Construction, Mar. 30, 2006, 15 pages.

Roychoudhury, Abhik, "Embedded Systems and Software Validation", In Publication of Morgan Kaufmann Publishers Inc. San Francisco, Jul. 8, 2009, 1 pages.

Sumner, et al., "Selecting Peers for Execution Comparison", In Proceedings of the International Symposium on Software Testing and Analysis, Jul. 17, 2011, pp. 309-319.

Le, et al., "Lecture 11. Applications of Program Analysis", http://web.cs.iastate.edu/~weile/cs641/11.ApplicationsOfProgramAnalysis.pdf, Published on: Dec. 2014, 13 pages.

Roychoudhury, Abhik, "Debugging as a Science, that too, when your Program is Changing", In Journal of Electronic Notes in Theoretical Computer Science, vol. 266, Oct. 12, 2010, pp. 1-12.

Roychoudhury, et al., "Formula-Based Software Debugging", In Journal of Communications of the ACM, vol. 59, issue 7, Jul. 2016, 11 pages.

Bhansali, et al., "Framework for Instruction-level Tracing and Analysis of Program Executions", In Proceedings of the 2nd international conference on Virtual execution environments, Jun. 14, 2006, pp. 154-163.

King, et al., "Debugging operating systems with time-traveling virtual machines", In Proceedings of the USENIX Annual Technical Conference, Apr. 10, 2005, 22 pages.

"Chronon Time Travelling Debugger", http://chrononsystems.com/products/chronon-time-travelling-debugger, Retrieved on: Nov. 28, 2016, 4 pages.

Khanse, A: "Microsoft Time Travel Tracing Diagnostic Tool", http://www.thewindowsclub.com/microsoft-time-travel-tracing-diagnostic, Published on: Jul. 21, 2013, 3 pages.

Lewis, Bill, "Debugging Backwards in Time", In Proceedings of the Fifth International Workshop on Automated Debugging, Sep. 2003, pp. 225-235.

Booth, et al., "Walk Backwards to Happiness—Debugging by Time Travel", In Technical Report CSM-143, Jul. 1997, 14 pages.

Phang, et al., "Expositor: Scriptable Time-Travel Debugging with First-Class Traces", In Proceedings of 35th International Conference on Software Engineering, May 18, 2013, pp. 352-361.

Pothier, et al., "Summarized Trace Indexing and Querying for Scalable Back-in-Time Debugging", In Proceedings of 25th European Conference on Object-Oriented Programming, Jul. 25, 2011, 558-582 pages.

Office Action cited in U.S. Appl. No. 15/453,060 dated Oct. 17, 2017.

Office Action cited in U.S. Appl. No. 15/453,008 dated Oct. 19, 2017.

Office Action cited in U.S. Appl. No. 15/591,521 dated Oct. 20, 2017.

Visan, et al., "Temporal Debugging: Automating Time Travel Debugging with WRDB", http://www.ccs.neu.edu/home/xindong/oopsla10.pdf, Published on : Mar. 26, 2010, 1-12 pages.

Barr, et al., "Time-Travel Debugging for JavaScript/Node.js", In Proceedings of the ACM International Symposium on the Foundations of Software Engineering, Sep. 12, 2016, 5 pages.

"Elm's Time Traveling Debugger", https://web.archive.org/web/20140416213617/http:/debug.elm-lang.org/, Published on: Apr. 16, 2014, 4 pages.

Argelius, Andreas, "Time Travel in React Redux apps using the Redux DevTools", https://onsen.io/blog/react-redux-devtools-with-time-travel/, Published on: Jun. 13, 2016, 13 pages.

Bowman, et al., "Optimization of Query Streams Using Semantic Prefetching", In Journal of ACM Transactions on Database Systems, vol. 30 issue 4, Jun. 13, 2004, 12 pages.

Wang, et al., "An Effective Reversible Debugger of Cross Platform Based on Virtualization", In Proceedings of International Conference on Embedded Software and Systems, May 25, 2009, pp. 448-453.

Jensen, et al., "MemInsight: Platform-Independent Memory Debugging for JavaScript", In Proceedings of the 2015 10th Joint Meeting on Foundations of Software Engineering, Aug. 30, 2015, 12 pages.

Hicks James E., "Compiler-Directed Storage Reclamation Using Object Lifetime Analysis", In Technical Report of MIT/LCS/TR-555, Oct. 1992, 183 pages. ( 2 parts).

Notice of Allowance cited in U.S. Appl. No. 15/591,706 dated Nov. 27, 2017.

Weiss, et al: ROOT: Replaying Multithreaded Traces with Resource-Oriented Ordering, Nov. 2013, 15 pages.

Nu, et al: "Elastic and scalable tracing and accurate replay of non-deterministic events," Jun. 2013, 10 pages.

Bravo, et al: "Towards effective and efficient search-based deterministic replay," Nov. 2013, 6 pages.

Notice of Allowance cited in U.S. Appl. No. 15/453,060 dated Dec. 29, 2017.

"Notice of Allowance Issued in U.S. Appl. No. 15/591,521", dated Jan. 23, 2018, 9 pages.

"Notice of Allowance Issued in U.S. Appl. No. 15/591,583", dated Oct. 25, 2017, 15 Pages.

Cutulenco, et al., "Mining timed regular expressions from system traces", In Proceedings of the 5th International Workshop on Software Mining, SoftwareMining 2016, Sep. 3, 2016, 8 Pages.

Deutch, et al., "Type inference and type checking for queries on execution traces", In Proceedings of the VLBD Endowment, vol. 1 Issue 1, Aug. 2008, 12 Pages.

Dietrich, et al., "Learning effective query transformations for enhanced requirements trace retrieval", In Proceedings of 2013 28th IEEE/ACM International Conference on Automated Software Engineering (ASE), Nov. 11, 2013, 6 Pages.

Goldsmith, et al., "Relational Queries over Program Traces", In Proceedings of 20th Annual ACM SIGPLAN Conference on Object-Oriented Programming, Systems, Languages, and Applications, Oct. 16, 2005, 18 Pages.

Herbert, Prahofer, et al., "Reverse engineering and visualization of the reactive behavior of PLC applications", In Proceedings of 11th IEEE International Conference on Industrial Informatics (INDIN), Jul. 29, 2013, 8 Pages.

Lhadj, et al., "An Efficient Algorithm for Detecting Patterns in Traces of Procedure Calls", In Proceedings with ICSE Workshop on Dynamic Analysis, WODA 2003, 2003, 4 Pages.

Pauw, et al., "Execution patterns for visualizing web services", In Proceedings of the 2006 ACM symposium on Software visualization, Sep. 4, 2006, 9 Pages.

"International Search Report Issued in US Patent Application No. PCT/US18/033574", dated Aug. 30, 2018, 15 Pages.

(56) References Cited

OTHER PUBLICATIONS

"International Search Report and Written Opinion Issued in PCT Application No. PCT/US2018/020829", dated Jul. 6, 2018, 14 Pages.

* cited by examiner

205

```
                 1  ReturnType* GetProcessingResults(InputType* pInput) {        206
             ⎧ 2     KeyType* key = pInput->GetKey();
          A ─⎨ 3     ReturnType* pRetVal = s_cache->TryGet(key);
             ⎩ 4     if (pRetVal == nullptr) {
Sub-Entities ⎧ 5         pRetVal = PerformExpensiveCalculation(pInput);
    207    B ⎨ 6         s_cache->Add(key, pRetVal);
             ⎩ 7     }
          C ─{ 8     return pRetVal;
                 9  }
```

| Categories / 208a | Attributes / 208b | / 208 |
|---|---|
| Results Cached | A=1 ; C=1  (B=0 ; A+B=0 ; B+C=0 ; A+B+C=0) |
| Results un-Cached | A=1 ; B=1 ; C=1 ; A+B=1 ; B+C=1 ; A+B+C=1 (A+C=0) |
| ••• | ••• |

Invocation 1 — *302*

```
1 bool IsPointingToOne(char* ptr)
2 char toInspect=*ptr;
3 if(toInspect=='1') {
4   return true;
5 }
6 return false;
7 }
```

Invocation 2 — *303*

```
1 bool IsPointingToOne(char* ptr)
2 char toInspect=*ptr;
3 if(toInspect=='1') {
4   return true;
5 }
6 return false;
7 }
```

Invocation 1 — *305*

```
1 bool IsPointingToOne(char* ptr)
2 char toInspect=*ptr;
3 if(toInspect=='1') {
4   return true;
5 }
6 return false;
7 }
```

Invocation 2 — *306*

```
1 bool IsPointingToOne(char* ptr)
2 char toInspect=*ptr;
3 if(toInspect=='1') {
4   return true;
5 }
6 return false;
7 }
```

*FIG. 3B*

```
                                                   ┌─ 401
┌──────────────────────────────────────────────────┴──────────────┐
│ GetResults.cpp: Invocation X (vs. Invocation Y)                 │
├─────────────────────────────────────────────────────────────────┤
│     11                                                          │
│     12                                                          │
│     13  ReturnType* GetProcessingResults(InputType* pInput) {   │
│     14    KeyType* key = pInput->GetKey();                      │
│     15    ReturnType* pRetVal = s_cache->TryGet(key);           │
│ →   16    if (pRetVal == nullptr) {                             │
│     17        pRetVal = PerformExpensiveCalculation(pInput);    │
│     18        s_cache->Add(key, pRetVal);                       │
│     19    }                                                     │
│     20    return pRetVal;                                       │
│     21  }                                                       │
│     22                                                          │
│                                                                 │
├─────────────────────────────────────────────────────────────────┤
│   →  ▶  ↶  ↶  ↷                                                 │
├──────────────────────────────┬──────────────────────────────────┤
│ BreakPoints:                 │ Differential Analysis            │
│ ☑ GetResults.cpp: 16         │ Current: GetProcessingResults:   │
│   (Automatic)                │   Invocation X                   │
│                              │   → GetResults.cpp:20            │
│                              │ Compare: GetProcessingResults:   │
│                              │   Invocation Y                   │
│                              │   → next:GetResults.cpp:17       │
└──────────────────────────────┴──────────────────────────────────┘
         402 (arrow to line 16)      403              404
```

*FIG. 4*

PRESENTING DIFFERENCES BETWEEN CODE ENTITY INVOCATIONS

BACKGROUND

When writing code during the development of software applications, developers commonly spend a significant amount of time "debugging" the code to find runtime and other source code errors. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

BRIEF SUMMARY

Embodiments herein expand the utility of time travel debuggers by leveraging recoded trace file data and machine learning to identify and present runtime differences between different invocations of an executable entity at a user interface. For example, embodiments may utilize machine learning on trace file data to classify different invocations of the same executable entity into different families, based on differences in their runtime behaviors (e.g., what blocks of code executed, what sequences of blocks of code executed, what exceptions were encountered, etc.). Embodiments can also identify what runtime behavioral attributes contributed to the different invocations being classified into the different families. Using this knowledge, embodiments can visually present differences between different invocations of the entity including, for example, which runtime differences contributed to the entity executing in different manners, coverage of code executed by different invocations, code paths taken by different invocations, what conditions contributed to invocations taking different branches, and the like.

In some embodiments, a method for presenting one or more differences between code entity invocations comprises identifying a code entity for which a differential analysis is to be performed. The method also includes identifying a plurality of families of invocations of the code entity. Each family is defined based upon a plurality of attributes that identify at least one class of runtime behavior of the code entity. The method also includes identifying one or more first attributes of a first family that substantially contribute to classifying a first class of invocations of the code entity within the first family, and one or more second attributes of a second family that substantially contribute to classifying a second class of invocations of the code entity within the second family. The method also includes presenting differences between at least two invocations of the code entity based on differences between the one or more first attributes and the one or more second attributes.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2B illustrates a second example of classifying related invocations of code entities into different families;

FIG. 3A illustrates a first example of presenting differences between invocations using a code comparison user interface;

FIG. 3B illustrates a second example of presenting differences between invocations using a code comparison user interface;

FIG. 4 illustrates an example of a user interface that presents differences during a time travel debugging session.

DETAILED DESCRIPTION

Embodiments herein expand the utility of time travel debuggers by leveraging recoded trace file data and machine learning to identify and present runtime differences between different invocations of an executable entity at a user interface. For example, embodiments may utilize machine learning on trace file data to classify different invocations of the same executable entity into different families, based on differences in their runtime behaviors (e.g., what blocks of code executed, what sequences of blocks of code executed, what exceptions were encountered, etc.). Embodiments can also identify what runtime behavioral attributes contributed to the different invocations being classified into the different families. Using this knowledge, embodiments can visually present differences between different invocations of the entity including, for example, which runtime differences contributed to the entity executing in different manners, coverage of code executed by different invocations, code paths taken by different invocations, what conditions contributed to invocations taking different branches, and the like.

Figure 1:
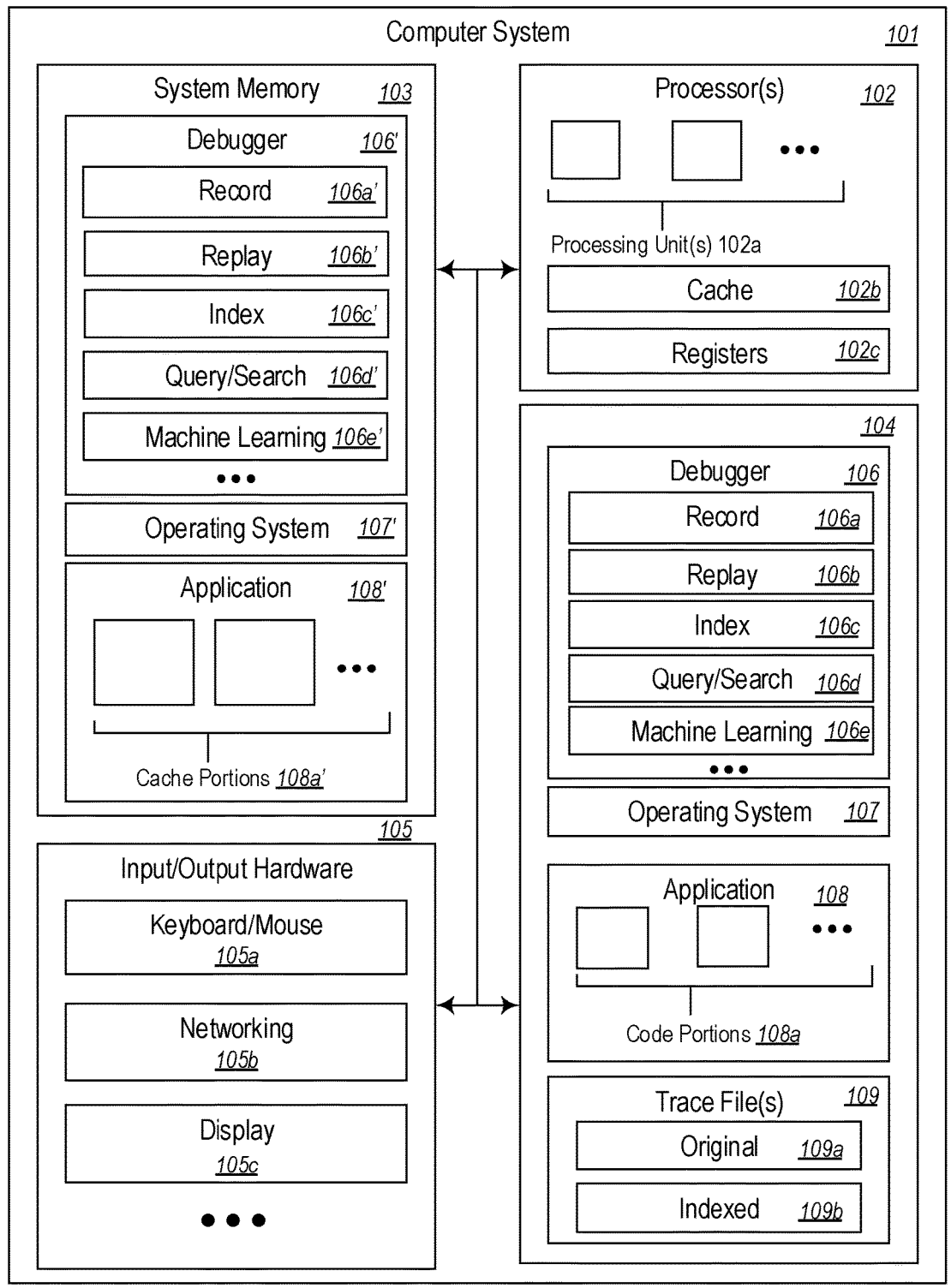
FIG. 1 illustrates an example computing environment that facilitates presenting differences between code entity invocations based on trace file data.

To the accomplishment of the foregoing, FIG. 1 illustrates an example computing environment 100 that facilitates presenting differences between code entity invocations based on trace file data. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as the depicted keyboard/mouse hardware 105a, networking hardware 105b, and display device 105c). In some embodiments, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The data store 104, which typically comprises durable storage, can store computer-executable instructions and/or data structures representing application code such as, for example, a debugger 106 (including, for example, a record component 106a, a replay component 106b, an indexing component 106c, a query/search component 106d, a machine learning component 106e, etc.), an operating system 107, and an application 108 (including portions of executable code 108a of the application 108). The data store 104 can also store other types of data, such as one or more trace file(s) 109. When application code is executing (e.g., using the processor(s) 102), the system memory 103 can store corresponding runtime data, such as runtime data structures, computer-executable instructions, etc. Thus, FIG. 1 illustrates the system memory 103 as including runtime debugger data 106' (runtime record data 106a', runtime replay data 106b', runtime indexing data 106c', runtime query/search component data 106d', runtime machine learning component data 106e', etc.), runtime operating system data 107', and runtime application data 108' (including, for example, runtime variables, data structures, etc. of application 108 as it executes, as well as runtime code portions 108a' which are in-memory copies of code portions 108a).

While the record component 106a, replay component 106b, indexing component 106c, query/search component 106d, and machine learning component 106e are depicted as being part of debugger 106, it will be appreciated that one or more of these components could be a standalone application, or part of some other application. The record component 106a is usable to trace execution of an application, such as application 108 (including its executable code portions 108a), and to store trace data in the trace file(s) 109. The record component 106a may, in some embodiments, be integrated into the operating system 107, itself, into a hypervisor, or into some other runtime or virtualization technology. The record component 106a may also exist at an entirely different computer system. Thus, the record component 106a may trace execution of code at another computer system. Then, the trace file(s) 109 resulting from that tracing can be transferred (e.g., using the networking hardware 105b) to the computer system 101 for indexing by the indexing component and/or replay by the replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes processing unit(s) 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more virtual processing units 102a presented by that single physical processing unit.

Each processing unit 102a executes processor instructions that are defined by applications (e.g., debugger 106, operating system 107, application code portions 108a, etc.), and which instructions are selected from among a predefined processor instruction set architecture. The particular instruction set architecture of a given processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102b, based on data in registers 102c, and/or without input data. In general, the shared cache 102b is a small amount (i.e., small relative to the typical amount of system memory 103) of random-access memory that stores on-processor copies of portions of the system memory 103. For example, when executing the executable code portions 108a of application 108, the shared cache 102b stores a subset of the runtime code portions 108b' in a code cache section of the shared cache 102b, and stores other runtime application data 108' (e.g., variables, data structures, etc.) in a data cache section of the shared cache 102b. If the processing unit(s) 102a require data not already stored in the shared cache 102b, then a "cache miss" occurs, and that data is fetched from the system memory 103 (potentially evicting some other data from the shared cache 102b). The registers 102c are hardware based storage locations that are defined based on the instruction set architecture of the processors(s) 102.

The replay component 106b replays one or more trace file(s) 109 by executing the code of the executable entity upon which the trace file(s) 109 are based at the processor(s) 102, while supplying that code with traced data (e.g., register values, memory values, etc.) from the trace file(s) 109 at appropriate times. Thus, for example, the record component 106a may record execution of one or more code portions 108a of application 108 at the processor(s) 102, while storing trace data (e.g., memory values read by code instructions, register values supplied code instructions, etc.) in the trace files(s) 109. Then, the replay component 106b can re-execute the code portion(s) 108a at the processor(s) 102, while supplying that code with the trace data from the trace files(s) 109 so that the code is executed in the same manner that it was at trace time.

According the embodiments herein, the indexing component 106c may take as input one or more trace file(s) 109 (e.g., original trace file(s) 109a), and record one or more trace file(s) 109 (e.g., indexed trace file(s) 109b). Indexing generally outputs indexed trace file(s) 109b that are structured to improve replay performance, such as by inserting key frames at various points in the trace (i.e., so that the replay component 106b can initiate replay at various places in the trace), and by inserting additional indexing data structures such as memory snapshots, reverse lookup data structures (that enable the replay component 106b to quickly identify trace segments relevant to desired data, such as accessed memory locations, return values seen, input parameters seen, and the like), etc.

While FIG. 1 illustrates original trace file(s) 109a and indexed trace file(s) 109b as being separate, it will be appreciated that they could actually be the same file. For example, rather than recording an entirely new file, the indexing component 106c may update/augment the input trace file with indexing data. For example the indexing component 106c may update existing data streams of an input trace file, insert additional data streams into an input trace file, append data to the end of an input trace file, prepend data to the beginning of an input trace file, etc.

The query/search component 106d conducts uses the indexed trace file(s) 109b to respond to user inquiries. For example, a query may use the replay component 106b to replay select portions of the indexed trace file(s) 109*b* in order to return a raw data set that is responsive to a user's query. A search may further apply rules and machine learning of past queries and/or searches to filter a data set in order to return ranked results that attempt to surface the more relevant results responsive to a user's search.

The machine learning component 106*e* applies machine learning techniques to data in the trace file(s) 109 in order to identify attributes relating to execution of one or more of code portions 108*a*, and to classify these attributes into different families. These families of attributes are then usable by the debugger 106 to enhance and refine the data presented to a user, such as by the replay component 106*b* or the query/search component 106*d*. As will be discussed in more detail later, this includes utilizing the families to present runtime differences between different invocations of an executable entity at a user interface (e.g., by the replay component 106*b* and/or the query search component 106*d*).

In some embodiments, the index component 106*c* utilizes the machine learning component 106*e* to produce and store these families into indexed trace file 109*d* during an indexing run. In additional or alternative embodiments, the replay component 106*b* and/or the query search component 106*d* utilize the machine learning component 106*e* in order to apply machine learning on-the-fly in order to respond user-provided commands and requests. When doing so, the replay component 106*b* and/or the query search component 106*d* may cause the indexed trace file 109*d* to be augmented any data produced.

As mentioned, the machine learning component 106*e* identifies attributes relating to execution of one or more of code portions 108*a*, and to classifies these attributes into different families. Each family identifies invocations of the one or more of code portions 108*a* that are related to each other by their runtime behavior. For example, the same portion of code may execute in different manners when it is invoked due to changes in the environment in which it executes, changes in inputs, changes in timing, etc. The machine learning component 106*e* therefore identifies different classes of behavior that particular code exhibits when it is invoked, and groups these invocations into different families. For example, if the subject code portion is as function, one family could group patterns of invocations of the function that caused an exception, another family could group patterns of invocations of the function that returned a first return value or a first family of related return values, and yet another family could group patterns of invocations of the function that returned a second return value or a second family of related return values. The machine learning component 106*e* may also identify a ranking among these families. For example, the families may, in some embodiments, be ranked according to the frequency with which the invocations they identify occurred during execution. Thus, in these embodiments, families of less frequent (i.e., rare) invocations may be ranked higher than families of more frequent (i.e., common) invocations.

The particular machine learning algorithm(s) used by the machine learning component 106*e* can vary depending on implementation goals. However, two classes of machine learning algorithms that may be useful are cluster analysis algorithms and anomaly detection algorithms. Cluster analysis refers to classes of machine learning algorithms that group a set of objects in such a way that objects in the same group, or "cluster," are more similar to each other (in at least one way) than those in other clusters. Anomaly detection, on the other hand, refers to classes of machine learning algorithms that identify items in a dataset that do not conform to an expected pattern or other items in the dataset.

In some embodiments, the machine learning component 106*e* may use supervised machine learning, in which the machine learning algorithm(s) are supplied with a training dataset. For example, a training dataset could include the identity of desirable types of families, along with example invocations that should be classified under each family. In other embodiments, however, the machine learning component 106*e* may operate unsupervised, in which it performs its analysis without training data. Thus, the machine learning component 106*e* may, itself, determine common types of families and the patterns of invocations that belong to those families. In either embodiment, classification models developed by the machine learning algorithm(s) may be refined based on user feedback and/or analysis of how users interact the search result set (e.g., which results the user interacts with).

Figure 2A:
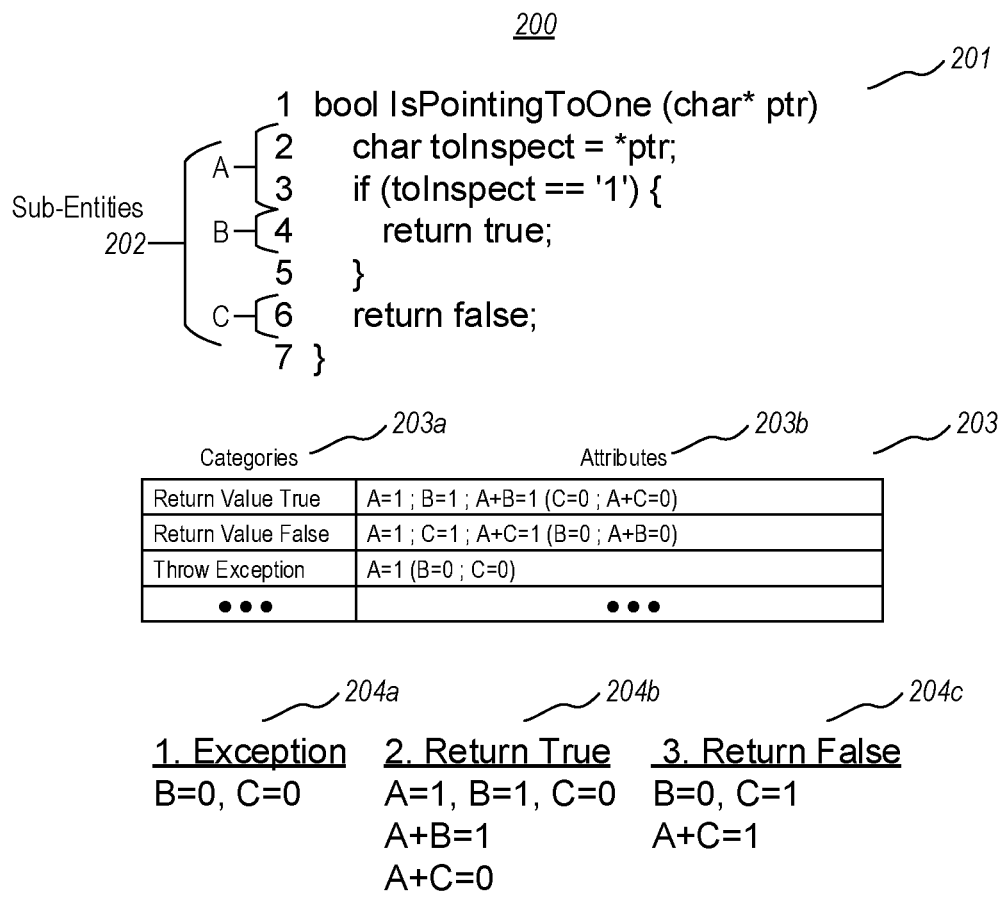
FIG. 2A illustrates a first example of classifying related invocations of code entities into different families.

To facilitate a further understanding of machine learning techniques, FIGS. 2A and 2B illustrate some concrete examples of classifying related invocations of code entities into different families. FIG. 2A provides one example 200 of machine learning that may be applied based on a code entity comprising a simple function 201, IsPointingToOne( . . . ). Note that while, for simplicity in description, function 201 shown in a higher-level programming language, in some embodiments it may be preferable for the search component 1500 to operate more granularly at the level lower-level assembly language/processor instructions.

As will be recognized by those skilled in the art, function 201 receives as an input parameter a pointer (ptr) to a character, and it returns a Boolean—true if the character's value is one, or false if the character's value is anything other than one. In particular, at line 2, function 201 dereferences ptr to obtain the character's value, storing that value in the variable toInspect, and then at line 3 it determines if the value of toInspect is equal to one. If so, function 201 returns true at line 4, or it otherwise returns false at line 6.

Invocations of function 201 are analyzed (e.g., by the machine learning component 106*e*) to determine different families of its invocations share the same or similar characteristics that may be of interest in relation to execution of function 201 (and particularly as they relate to debugging). Thus, invocations of function 201 can be grouped according to these families.

As mentioned above, machine learning algorithms can be trained with training datasets. Thus, a user may possibly supply the identity of desired categories of families as part of training datasets, though they can also be identified by using unsupervised machine learning. For example, some categories of families—shown in the first column 203*a* of table 203—may include those invocations that returned true, those invocations that returned false, and those invocations that threw an exception (i.e., due to a failure to dereference ptr at line 2).

It will be recognized by those skilled in the art that after executing function 201 a great number of times (e.g., tens, hundreds, thousands, or more)—and depending on the environment in which function 201 executes—one likely pattern of the invocations of function 201 may be that the majority of the invocations returned false (i.e., ptr pointed to something other than one), that most of the remainder of the invocations returned true (i.e., ptr pointed to one), and that a small set of the remainder of the invocations threw an exception (i.e., ptr could not be dereferenced since it pointed to an invalid memory location, an inaccessible memory location, etc.).

There are of course other categories of families that may be used to group related function invocations (as indicated generally by the ellipses in table 203). These may include, for example, a return value type, the direct values of input parameters (e.g., particular addresses/address ranges to which ptr points), the indirect values of input parameters (e.g., the particular values/ranges of values of the characters that ptr references), input parameter types, the values of any global variables (which may, for example, affect the value of ptr and/or the locations it references based on code other than function 201), the types of exceptions thrown, the number of instructions executed during the invocation of function 201, the count of branches taken and/or not taken for each decision point (e.g., the number of times the "if" path is taken at line 3; other types of counts could include the number of times an "else" path is taken, the number of iterations of a loop, etc.), the number of times each sub-entity (block or sub-function) is executed, data structures changed, etc.

In some embodiments, classifying related invocations of entities (e.g., function 201) into families comprises dividing those entities into sub-entities (e.g., blocks or sub-functions), and analyzing patterns of invocations of those sub-entities. For example, when operating at the level of processor instructions, sub-entities could comprise "basic blocks"—which are known to those of skill in the art as sequences of instructions that are an execution unit (i.e., in which all or none of the instructions in the block executes, exceptions aside). These sub-entities can be viewed as "virtual" functions, or being separate functions that are invoked by the larger entity (e.g., function 201). Thus, the families can, in some embodiments, group not only invocations of the overall entity, but also related invocations of sub-entities (or sequences of invocations of sub-entities).

For example, referring to function 201, FIG. 2A illustrates three possible sub-entities 202 (i.e., blocks A, B, and C). Block A includes lines 2 and 3 (which dereference ptr and determine if the dereferenced value equals one), block B includes line 4 (which returns true), and block C includes line 6 (which returns false). Note that if the machine learning component 106e was operating at the level of processor instructions, rather than lines of higher-level source code, each block could include many individual instructions.

The machine learning component 106e can analyze different invocations of function 201—including invocations of its sub-entities 202—in order to group these invocations into different families. Thus, input to machine learning algorithm(s) may be attributes/variables comprising whether or not individual sub-entities (e.g., basic blocks) were invoked during invocation of function 201. As indicated, the families in which invocations are grouped may be suggested by a human user (e.g., as part of a training dataset), or may be identified entirely by the machine learning component's 106e own analysis.

For example, table 203 shows mappings between possible categories of families of invocations of function 201 (i.e., column 203a) and attributes values defined by sub-entities (A, B, and C) corresponding to those categories (i.e., column 203b). As shown in column 203a, possible families include when function 201 returned true, when function 201 returned false, and when function 201 threw an exception. In particular, the category "Return Value true" corresponds to attribute A=1 (i.e., block A is invoked once when function 201 returns true), attribute B=1 (i.e., block B is invoked once when function 201 returns true), and attribute A+B=1 (i.e., the sequence A+B is invoked once when function 201 returns true). Attributes C=0 and A+C=0 indicate that block C and sequence A+C are not invoked when function 201 returns true. Similarly, the category "Return Value false" corresponds to attributes A=1, C=1, and A+C=1 (and block B and the sequence A+B are not invoked when function 201 returns false). The category "Throw Exception" corresponds to attribute A=1 (and blocks B and C are not invoked when function 201 throws an exception, nor are any combinations of blocks invoked). Note that column 203a is shown for clarity and ease in description, in order to introduce the concepts of grouping code entities into categories, and that identity of categories may, or may not, be known prior to a machine learning analysis based on the attributes in column 203b.

When the attributes in column 203b are supplied to one or more machine learning algorithm(s), those algorithm(s) identify set(s) of attribute(s) that go together in the same family. They can also identify one or more of the families, themselves, and/or group sets of attributes according to one or more predefined families. The algorithm(s) can also rank the families based on the frequency the occurrence of the set(s) of attributes in each family during execution.

Accordingly, FIG. 2A shows three families 204a-204c that each includes sets of attributes that go together, because they characterize invocations of function 201 based on whether it returned true, whether it returned false, or whether it threw an exception. In particular, FIG. 2B shows a first family 204a that includes one set of attributes (i.e., B=0, C=0) that characterize invocations in which function 201 threw an exception, a second family 204b that includes three sets of attributes (i.e., A=1, B=1, C=0; A+B=1; and A+C=0) that characterize invocations in which function 201 returned true, and a third family 204c that includes two sets of attributes (i.e., B=0, C=1 and A+C=1) that characterize invocations in which function 201 returned false. Note that sets of attributes shown are examples only, and are not exhaustive. Additionally, there is some redundancy in the sets of attributes shown—for example, the sets in family 204b could be merged to "B=1, C=0," and the sets in family 204c could be merged on "B=0, C=1."

Note that in FIG. 2A the families 204a-204c have been sorted by rarity, in which invocations throwing exceptions are most rare and invocations returning false are most frequent. In particular, family 204a is ranked first since the sets of values it identifies occurred least frequently during different invocations of function 201, and family 204c is ranked last since the sets of values it identifies occurred most frequently during different invocations of function 201. This ranking may be based, at least in part, on replaying (i.e., by the replay component 106b) of instances of function 201 as recorded by a trace, and identifying the frequency with which each sequence occurred during execution. Additionally or alternatively, this ranking may be based, at least in part, on reference to indexed data, such as reverse lookup data structures. These rankings are usable for identifying which famil(ies) of invocations might be "normal" and which famil(ies) of invocations might be "abnormal."

FIG. 2B provides another example 205 of machine learning that may be applied to a more complicated function 206, GetProcessingResults( . . . ), that returns cached data, and which performs needed processing if the requested data is not in the cache. As will be recognized by those skilled in the art, function 206 receives as an input parameter a pointer (pInput) to input of the type InputType, and it returns a pointer to data of the type ReturnType that results from processing on pInput by the function PerformProcessing( . . . )—which is assumed in this example to be expensive enough to warrant caching the result. More particularly, function 206 obtains a key from pInput at line 2. Then, at line 3 is obtains—based on the key—a pointer to cached processing data from cache s_cache (i.e., the results from a prior processing of pInput by PerformProcessing( . . . )). At line 4 function 206 checks if there was no cached processing data (i.e., the pointer obtained at line 3 is null). If so, it performs the processing at line 5 and adds it to s_cache at line 6. Then, at line 8, function 206 returns the cached data (whether it already existed, or whether it was just added).

FIG. 2B also illustrates three possible sub-entities 207 of function 207 (i.e., blocks A, B, and C). Block A includes lines 2 and 3 (which obtain a key from pInput and obtain a pointer to that key in s_cache), block B includes lines 5 and 6 (which calls PerformExpensiveCalculation( . . . ) on pInput and caches the result), and block C includes line 8 (which returns a pointer to the cached result).

In addition, while there are a vast array of categories of families that could be used in connection with grouping invocations of GetProcessingResults( . . . ), FIG. 2B shows in the first column 208a of table 208 that two possible categories are whether the results were cached or un-cached. Table 208 also shows in the second column 208b that invocations that returned cached results have the attributes A=1, C=1, and A+C=1 (i.e., block A and block C are invoked one time each, and sequence A+C is invoked once). Block B and the sequences A+B, B+C, and A+B+C are not invoked. Invocations that returned un-cached results have the attributes A=1, B=1, C=1, A+B=1, B+C=1, and A+B+C=1 (i.e., blocks A, B, and C are invoked one time each, and sequences A+B, B+C, and A+B+C are each invoked once). The sequence A+C is not invoked.

Similar to FIG. 2A, the data in table 208 (e.g., the attributes in column 208b) can be used as input to one or more machine learning algorithm(s) in order to generate ranked families, including, for example, a family identifying set(s) of attributes characterizing invocations of function 206 that returned a cached result directly, and a family identifying set(s) of attributes characterizing invocations of function 206 that returned an un-cached result. These families can be ranked according to the frequency of the occurrence each family's set(s) of attributes.

For simplicity, the foregoing examples focused on classifying the behaviors invocations of individual functions using input attributes comprising basic blocks making up those functions. However, one of ordinary skill in the art will recognize, in view of the disclosure herein, that this is only one example way of applying machine learning to trace data. For example, machine learning could additionally or alternatively classify invocations at the levels of classes, modules, libraries, source code files, etc. Additionally, the attributes used as input to machine learning algorithms could comprise basic blocks (as in the foregoing examples), unique sequences of basic blocks (e.g., "n-grams" of basic blocks) that repeatedly occurred during an invocation, a count of individual basic blocks and/or n-grams that occurred during an invocation (e.g., due to loops/jumps in code), type(s) of exception(s) that occurred during execution of an invocation, a count of exceptions that occurred during execution of an invocation, functions and/or n-grams of functions that were executed during an invocation (e.g., if the invocation is at the level of a source code file, class, module, etc.), and the like.

Embodiments can utilize the foregoing machine learning—including use of families of code entity invocations identified by machine learning in order to clearly present to a user runtime differences between different invocations (or families of invocations) of a code entity. For example, based on an identification of a code entity (e.g., source code file, class, module, function, etc.) for which a differential analysis is to be performed, and based on an identification of two or more invocations of that code entity that are to be compared, the machine learning component 106e can utilize the families of invocations—including the attributes associated with those families—to identify one or more differences in the manner in which those invocations executed at runtime. Those runtime differences can then be presented at a user interface (e.g., by the replay component 106b, the query/search component 106d, etc.).

Runtime differences between invocations can be identified based on the differences between the attributes associated with the families to which the invocations that are being compared have been sorted. For example, referring back to FIG. 2A, if one or more invocation(s) of function 201 that returned true are being compared to one or more invocation(s) of function 201 that returned false, the differences between the attributes in family 204b and the attributes in family 204c can be used to identify differences in runtime behavior between the invocations. In some embodiments all (or substantially all) of the attributes for each family may be presented as representing runtime behavior of each invocation. For example, when considering each block (A, B, and C) of function 201 individually, the attributes of "A=1, B=1, and C=0" contributed to invocations of function 201 being classified as returning true, while attributes of "A=1, B=0, and C=1" contributed to invocations of function 201 being classified as returning false. Thus, the runtime behaviors between two invocations could be presented based on these attributes.

FIG. 3A illustrates one example of presenting differences between invocations using a code comparison user interface 301, in which the coverage of code executed by each invocation is presented side-by-side. User interface 301 may, for example, be presented by the query/search component 106d based on a selection of search results, or by replay component 106b based on a selection of a function during a debugging session. In FIG. 3A, code coverage of a first invocation of function 201 that returned true is displayed in a left pane 302, and code coverage of a second invocation of function 201 that returned false is displayed in a right pane 303. In this example, user interface 301 indicates code coverage by emphasizing executed lines of code in bold face, though this could be done in a number of manners such as through use of colors, different font faces, different font sizes, pointers or other indicators, etc. Here, since the first invocation executed blocks A and B, the lines corresponding to those blocks (2-4) are shown in bold in the left pane 302, and since the second invocation executed blocks A and C, the lines corresponding to those blocks (2, 3, and 6) are shown in bold in the right pane 303. Thus, at a quick glance, a user can identify differences between how the different invocations executed.

In some embodiments the machine learning component 106e can offer further refinements by identifying only a subset of attributes for each invocation to present—such as only those attributes that substantially contributed to an invocation being categorized under a family, or only those attributes that contributed most to an invocation being categorized under a family. For example, while the attributes of "A=1, B=1, and C=0" contributed to invocations of function 201 being classified as returning true, and the attributes of "A=1, B=0, and C=1" contributed to invocations of function 201 being classified as returning false, some attributes contributed more than others. Since both invocations executed code block A, this attribute did not contribute to the decision to classifying these invocations into family 204*b* versus family 204*c*. However, attributes B and C did. As such, when presenting differences between invocations, that presentation may distinguish the invocations based on attributes B and C, while excluding attribute A.

FIG. 3B illustrates another example of presenting differences between invocations using a code comparison user interface 304 that is similar to user interface 301. Like interface 301, user interface 304 presents code executed by each invocation side-by-side (with execution of a first invocation represented in a left pane 305 and execution of a second invocation represented in a right pane 306). However, unlike user interface 301—which highlights full code coverage, user interface 304 highlights only the code that substantially contributed (or contributed most) to the invocation being classified into its respective family. Thus, since the first invocation's execution of block B contributed most to it being classified as returning true, only line 4 (corresponding to block B) is shown in bold in the left pane 305. Similarly, since the second invocation's execution of block C contributed most to it being classified as returning false, only line 6 (corresponding to block C) is shown in bold in the right pane 306. Thus, at a quick glance, a user can quickly drill down to the code that was most important for causing different behaviors between two invocations.

Note that hybrid approaches are also possible. For example, a user interface may present full code coverage between invocations, but emphasize the particular portions that contributed most to differing behaviors. For example, panes 302 and 305 could be combined by emphasizing lines 2 and 3 in a first color (i.e., to indicate they were executed by the invocation) and emphasizing line 4 in a second color (i.e., to indicate that is was executed by the invocation, and that it contributed to the invocation returning true). Similarly, panes 303 and 306 could be combined by emphasizing lines 2 and 3 in a first color (i.e., to indicate they were executed by the invocation) and emphasizing line 6 in a second color (i.e., to indicate that is was executed by the invocation, and that it contributed to the invocation returning false).

Note that user interfaces such as user interface 301 and 304 can present additional information, depending on the attributes used to classify invocations. For example, if the code includes looping (e.g., statements such as for, while, etc.), a source code line corresponding to the loop could be annotated with a number of times the invocation took the loop. Additionally or alternatively, the number of times different lines were executed could be presented as a "heat map," such as using lighter shading for less frequently executed lines, and darker shading for more frequently executed lines. As another example, if the code includes branching (e.g., statements such as if, else, case, etc.), a source code line corresponding to the branch could be annotated with an indication of which branch was taken. In the case of branching, the source code line corresponding to the branch could further be annotated to highlight which condition of the branch (e.g., which parameter among a plurality of parameters) cause the branch to be taken in the way it was. As another example, if an exception occurred, the source code line that caused the exception could be annotated to indicate such, and could potentially include other information such as the exception type, a number of times the exception occurred, etc.

Other types of user interfaces for presenting differences between invocations are also possible. For example, FIG. 4 illustrates just one example of a user interface 400 that could present differences during a time travel debugging session. For example, FIG. 4 presents an example debugging session, such as one that could be presented by the replay component 106*b*, of a prior invocation of function 206 of FIG. 2B while comparing it to another invocation of function 206.

User interface 400 illustrates a few illustrative examples of how differential analysis could be applied while stepping through an invocation of function 206. As indicated in the header 401, the replay of execution of the code of GetResults.cpp during invocation X is being performed, while comparing it to invocation Y. In user interface 400, execution of function 206 during invocation X has been halted at line 16, as indicated by arrow 402. Here, as indicated in a breakpoint pane 403, the code replay has been halted do to a breakpoint. A user could have manually requested this breakpoint, however some embodiments contemplate automatically breaking replay when differences in execution between two invocations are encountered. Thus, as indicated in breakpoint pane 403, this breakpoint was set automatically, due to a difference in how the if statement was evaluated during execution of invocations X and Y. User interface also includes a differential analysis pane 404, which details these differences. For example, as indicated, the current invocation (X) evaluated the condition as false, and skipped to line 20. By contrast, the compared invocation (Y) evaluated the condition as true and proceeded to line 17.

There are many different ways in which an interface such as user interface 400 could present differences. For example, the user interface could hide or collapse code in which the invocations executed in the same manner, including entire branches of code in which the other invocation took the same code path. As another example, as user interface 400 could indicate at branches that the other invocation took the other path in a variety of manners (in addition or as an alternative to the differential analysis 404 shown), such as by highlighting or color-coding of lines of code taken by the other invocation (e.g., as described in connection with FIG. 3B), by using a tooltip or other form of popup associated with the line of code associated the condition, by annotating the line of code associated the condition with an icon or some other indicator, etc. Additionally, any of the examples discussed in connection with FIG. 3B could be applied to user interface 400, including presenting interface 400 in a split-pane view.

Differences could also be presented using a graphical view of paths taken. For example, a user interface could present high-level code structure in any relevant form, such as a tree, a graph, etc. This structure could then be annotated (e.g., with text, different colors, bolding, etc.) to indicate which paths different invocations took, how many times invocations executed certain elements, where exceptions occurred, etc. In some embodiments, different structures corresponding to different invocations could be visually presented side-by-side.

Additionally, while the user interfaces have been described as comparing differences between individual invocations, they could be equally applicable to comparing entire families of invocations (e.g., comparing a single invocation to a family of invocations, or comparing one family of invocations to another family of invocations). For example, rather than depicting differences in behaviors of individual invocations, the user interface could depict differences in behaviors that are common to all, most, or a statistically significant number of invocations in one family versus behaviors that are common to all, most, or a statistically significant number of invocations in another family.

Furthermore, while the user interfaces herein depict comparisons between two invocations (or families), they could be extended to comparing more than two invocations/families at the same time. For example, FIGS. 3A and 3B could use additional panes, or FIG. 4 could present information for alternate invocations beyond invocation Y.

Figure 5:
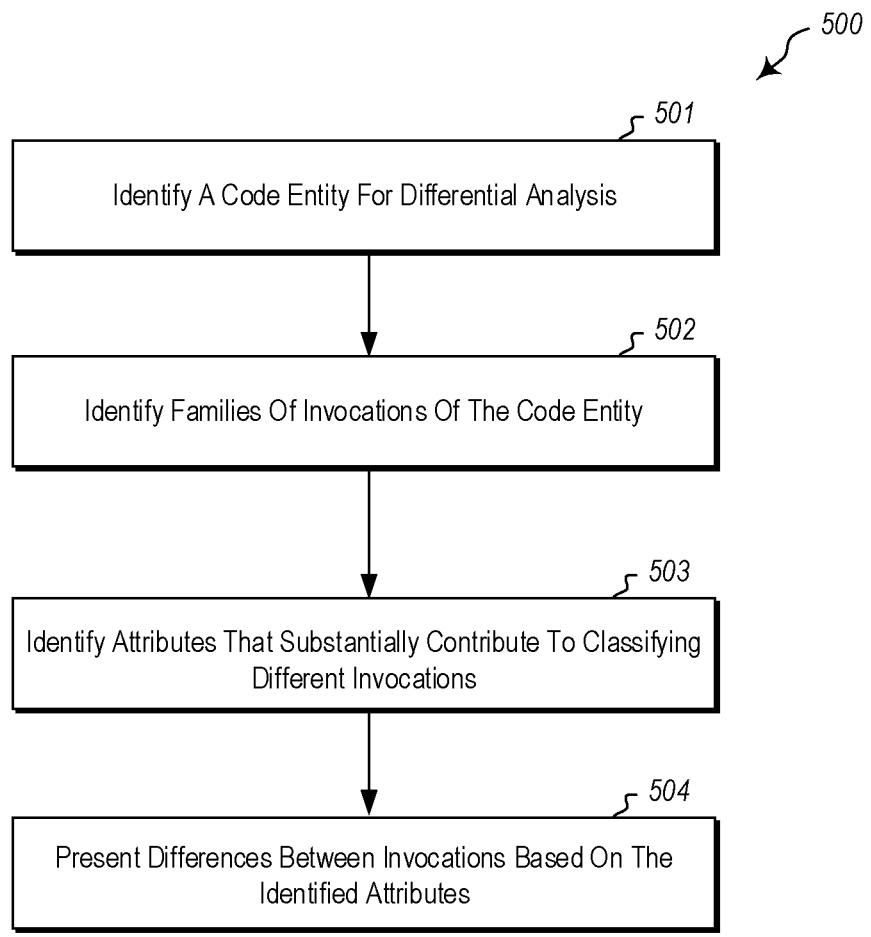
FIG. 5 illustrates a flowchart of an example method for presenting differences between code entity invocations.

In view of the foregoing, FIG. 5 illustrates an example of a method 500 for presenting differences between code entity invocations. Method 500 is described in view of FIGS. 1-4. While method 500 is presented as a series of acts, it will be appreciated that the particular number and ordering of the acts shown is only example of presenting differences between code entity invocations.

As depicted, method 500 includes an act 501 of identifying a code entity for differential analysis. In some embodiments, act 501 comprises identifying a code entity for which a differential analysis is to be performed. For example, a code entity could be selected based on user activity during replay by the replay component 106b, or based on a selection of search results presented by the query/search component 106d. This code entity could comprise executable instructions corresponding to an entire source code file or set of source code files, or executable instructions corresponding individual code sections, such as classes, modules, functions, etc.

Method 500 also includes an act 502 of identifying families of invocations of the code entity. In some embodiments, act 502 comprises identifying a plurality of families of invocations of the code entity, each family being defined based upon a plurality of attributes that identify at least one class of runtime behavior of the code entity. For example, as described in connection with FIGS. 2A and 2B, the machine learning component 106e can develop families of code entity invocations based on attributes (e.g., code blocks and/or code block sequences executed, exceptions encountered, a count of code blocks/sequences executed, etc.) that describe runtime behavior of different invocations. These families could be identified as part of indexing by the indexing component 106c, and/or based on a request by the replay component 106b and/or the query/search component 106d in response to user input.

Method 500 also includes an act 503 of identifying attributes that substantially contribute to classifying different invocations. In some embodiments, act 503 comprises identifying one or more first attributes of a first family that substantially contribute to classifying a first class of invocations of the code entity within the first family, and one or more second attributes of a second family that substantially contribute to classifying a second class of invocations of the code entity within the second family. For example, as discussed in connection with FIG. 2A, the machine learning component 106e can identify which attributes substantially contributed, or contributed most, to a subject invocation being classified within a particular family. Thus, for each invocation that is to be compared, these attributes can be identified.

Method 500 also includes an act 504 of presenting differences between invocations based on the identified attributes. In some embodiments, act 504 comprises presenting differences between at least two invocations of the code entity based on differences between the one or more first attributes and the one or more second attributes. For example, as described in connection with FIGS. 3A-4, there are a variety of ways in which differences could be presented at a user interface.

Presentation could include, for example, presenting a graphical view of first code coverage based on the one or more first attributes versus second code coverage based on the one or more second attributes (e.g., as shown in FIGS. 3A and 3B), presenting a graphical view of a first code path taken based on the one or more first attributes versus a second code path taken based on the one or more second attributes (e.g., as part of a tree or graph diagram), indicating that a second invocation took a different branch than the first invocation, automatically breaking at one or more branches taken by the second invocation, hiding one or more branches taken by the second invocation, indicating which of a plurality of conditions caused the second invocation to take an alternate execution path, etc.

Accordingly, the embodiments herein expand the utility of time travel debuggers by leveraging recoded trace file data and machine learning to identify and present runtime differences between different invocations of an executable entity at a user interface. Embodiments can visually present differences between different invocations of the entity including, for example, which runtime differences contributed to the entity executing in different manners, coverage of code executed by different invocations, code paths taken by different invocations, what conditions contributed to invocations taking different branches, and the like.

Although the subject matter has been described in language specific to structural features and/or methodological acts, it is to be understood that the subject matter defined in the appended claims is not necessarily limited to the features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
   one or more hardware processors; and
   one or more computer-readable media having stored thereon computer-executable instructions that are executable by the one or more processors to cause the computer system to identify and present one or more differences between code entity invocations recorded in a replayable trace, the computer-executable instructions including instructions that are executable to cause the computer system to perform at least the following:
   identify, within a replayable trace of a prior execution of code of an application, a code entity within the code of the application for which a differential analysis is to be performed;
   use the replayable trace, replay a plurality of prior invocations of the code entity to identify a plurality of families of invocations of the code entity, each family being defined based upon a plurality of attributes that identify at least one class of runtime behavior of the code entity that is observed during the replay of the plurality of invocations of the code entity;
   identify one or more first attributes of a first family that substantially contribute to classifying a first class of invocations of the code entity within the first family, and one or more second attributes of a second family that substantially contribute to classifying a second class of invocations of the code entity within the second family; and initiate presentation of differences between at least two invocations of the code entity based on differences between the one or more first attributes and the one or more second attributes, including:

during a replay of a first invocation of the code entity by a debugger, automatically halt replay at a point in the code entity at which execution of the first invocation of the code entity diverged from a second invocation of the code entity; and instruct the debugger to indicate a first code path taken next by the first invocation, along with and a second code path next taken by the second invocation.

2. The computer system of claim 1, wherein the one or more first attributes contribute most to classifying the first class of invocations of the code entity within the first family, and wherein the one or more second attributes contribute most to classifying the second class of invocations of the code entity within the second family.

3. The computer system of claim 1, wherein the presentation of differences between at least two invocations of the code entity based on differences between the one or more first attributes and the one or more second attributes comprises:

presenting a graphical view of first code coverage based on the one or more first attributes versus second code coverage based on the one or more second attributes.

4. The computer system of claim 1, wherein the presentation of differences between at least two invocations of the code entity based on differences between the one or more first attributes and the one or more second attributes comprises:

presenting a graphical view of a first code path taken based on the one or more first attributes versus a second code path taken based on the one or more second attributes.

5. The computer system of claim 1, wherein the presentation of differences between at least two invocations of the code entity based on differences between the one or more first attributes and the one or more second attributes comprises:

when encountering a branch while stepping through a first invocation of the entity at a user interface, indicating that a second invocation took a different branch than the first invocation.

6. The computer system of claim 1, wherein the presentation of differences between at least two invocations of the code entity based on differences between the one or more first attributes and the one or more second attributes comprises:

while stepping through a first invocation of the entity at a user interface, hiding one or more branches taken by a second invocation.

7. The computer system of claim 1, wherein the presentation of differences between at least two invocations of the code entity based on differences between the one or more first attributes and the one or more second attributes comprises:

while stepping through a first invocation of the entity at a user interface, indicating which of a plurality of conditions caused a second invocation to take an alternate execution path.

8. The computer system of claim 1, wherein the plurality of attributes for at least one family comprises one or more of basic blocks executed, sequences of basic blocks executed, exceptions encountered, or a count of basic blocks executed.

9. The computer system of claim 1, wherein the presentation of differences between at least two invocations of the code entity comprises presenting differences between at least one invocation of the code entity and a family of invocations of the code entity.

10. A method, implemented at a computer system that includes one or more processors, for identifying and presenting one or more differences between code entity invocations recorded in a replayable trace, the method comprising:

identifying, within a replayable trace of a prior execution of code of an application, a code entity within the code of the application for which a differential analysis is to be performed;

using the replayable trace, replay a plurality of prior invocations of the code entity to identifying a plurality of families of invocations of the code entity, each family being defined based upon a plurality of attributes that identify at least one class of runtime behavior of the code entity that is observed during the replay of the plurality of invocations of the code entity;

identifying one or more first attributes of a first family that substantially contribute to classifying a first class of invocations of the code entity within the first family, and one or more second attributes of a second family that substantially contribute to classifying a second class of invocations of the code entity within the second family; and initiating presentation of differences between at least two invocations of the code entity based on differences between the one or more first attributes and the one or more second attributes, including:

during a replay of a first invocation of the code entity by a debugger, automatically halting replay at a point in the code entity at which execution of the first invocation of the code entity diverged from a second invocation of the code entity; and instructing the debugger to indicate a first code path taken next by the first invocation, along with and a second code path next taken by the second invocation.

11. The method of claim 10, wherein the one or more first attributes contribute most to classifying the first class of invocations of the code entity within the first family, and wherein the one or more second attributes contribute most to classifying the second class of invocations of the code entity within the second family.

12. The method of claim 10, wherein the presentation of differences between at least two invocations of the code entity based on differences between the one or more first attributes and the one or more second attributes comprises:

presenting a graphical view of first code coverage based on the one or more first attributes versus second code coverage based on the one or more second attributes.

13. The method of claim 10, wherein the presentation of differences between at least two invocations of the code entity based on differences between the one or more first attributes and the one or more second attributes comprises:

presenting a graphical view of a first code path taken based on the one or more first attributes versus a second code path taken based on the one or more second attributes.

14. The method of claim 10, wherein the presentation of differences between at least two invocations of the code entity based on differences between the one or more first attributes and the one or more second attributes comprises:

when encountering a branch while stepping through a first invocation of the entity at a user interface, indicating that a second invocation took a different branch than the first invocation.

15. The method of claim 10, wherein the presentation of differences between at least two invocations of the code entity based on differences between the one or more first attributes and the one or more second attributes comprises:

while stepping through a first invocation of the entity at a user interface, hiding one or more branches taken by a second invocation.

16. The method of claim 10, wherein the presentation of differences between at least two invocations of the code entity based on differences between the one or more first attributes and the one or more second attributes comprises:

while stepping through a first invocation of the entity at a user interface, indicating which of a plurality of conditions caused a second invocation to take an alternate execution path.

17. The method of claim 10, wherein the plurality of attributes for at least one family comprises one or more of basic blocks executed, sequences of basic blocks executed, exceptions encountered, or a count of basic blocks executed.

18. A computer program product comprising one or more hardware storage devices having stored thereon computer-executable instructions that are executable by one or more processors to cause a computer system to identify and present one or more differences between code entity invocations recorded in a replayable trace, the computer-executable instructions including instructions that are executable to cause the computer system to perform at least the following:

identify, within a replayable trace of a prior execution of code of an application, a code entity within the code of the application for which a differential analysis is to be performed;

use the replayable trace, replay a plurality of prior invocations of the code entity to identify a plurality of families of invocations of the code entity, each family being defined based upon a plurality of attributes that identify at least one class of runtime behavior of the code entity that is observed during the replay of the plurality of invocations of the code entity;

identify one or more first attributes of a first family that substantially contribute to classifying a first class of invocations of the code entity within the first family, and one or more second attributes of a second family that substantially contribute to classifying a second class of invocations of the code entity within the second family; and initiate presentation of differences between at least two invocations of the code entity based on differences between the one or more first attributes and the one or more second attributes, including:

during a replay of a first invocation of the code entity by a debugger, automatically halt replay at a point in the code entity at which execution of the first invocation of the code entity diverged from a second invocation of the code entity; and instruct the debugger to indicate a first code path taken next by the first invocation, along with and a second code path next taken by the second invocation.

* * * * *

UNITED STATES PATENT AND TRADEMARK OFFICE
CERTIFICATE OF CORRECTION

PATENT NO. : 10,282,274 B2
APPLICATION NO. : 15/622841
DATED : May 7, 2019
INVENTOR(S) : Jordi Mola Page 1 of 1

It is certified that error appears in the above-identified patent and that said Letters Patent is hereby corrected as shown below:

In the Claims

Column 16
Line 56, change "use" to –using–

Column 17
Line 14, remove [and]

Column 18
Line 18, change "replay" to –replaying–
Line 19, change "identifying" to –identify–
Line 42, remove [and]

Column 20
Line 5, change "use" to –using–
Line 31, remove [and]

Signed and Sealed this
Eighteenth Day of June, 2019

Andrei Iancu
*Director of the United States Patent and Trademark Office*